(No Model.)
E. AUSTIN.
OIL AND WATER SEPARATOR.
No. 521,199. Patented June 12, 1894.
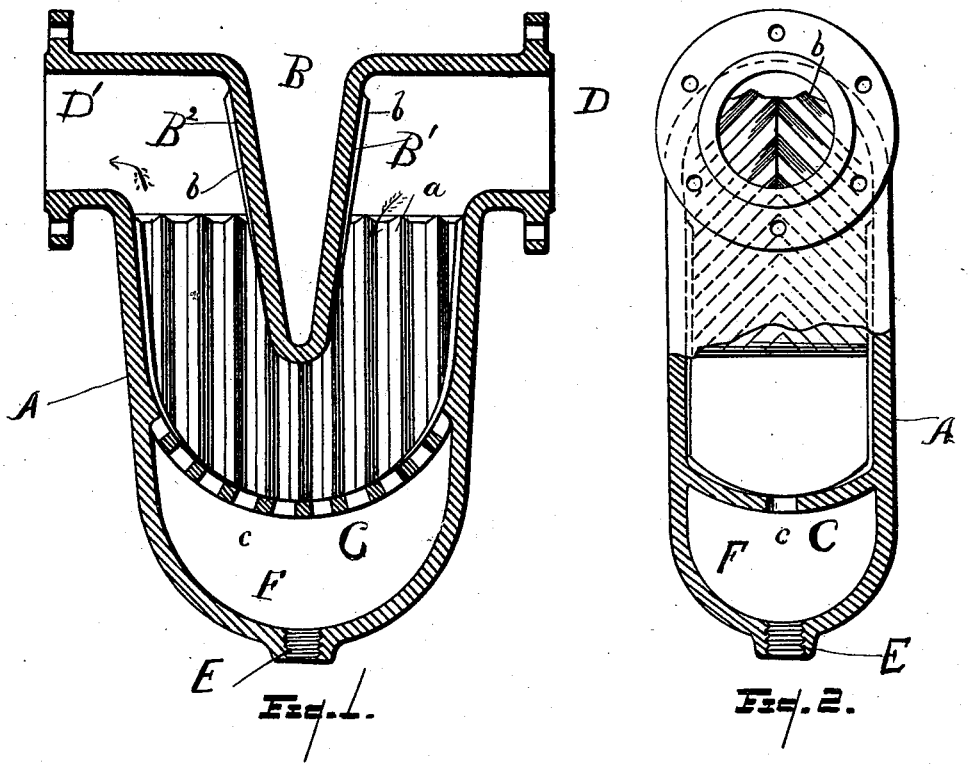
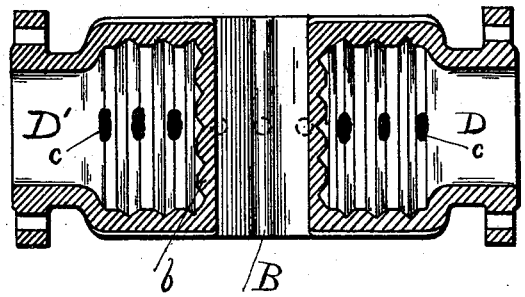
WITNESSES
J. E. Thomas
G. M. Davis.
INVENTOR
Eugene Austin
By C. H. Fisk
Attorney

UNITED STATES PATENT OFFICE.

EUGENE AUSTIN, OF DETROIT, MICHIGAN.

OIL AND WATER SEPARATOR.

SPECIFICATION forming part of Letters Patent No. 521,199, dated June 12, 1894.

Application filed March 23, 1894. Serial No. 504,752. (No model.)

*To all whom it may concern:*

Be it known that I, EUGENE AUSTIN, a citizen of the United States, residing at Detroit, county of Wayne, State of Michigan, have invented a certain new and useful Improvement in Oil and Water Separators; and I declare the following to be a full, clear, and exact description of the invention, such as will enable others skilled in the art to which it pertains to make and use the same, reference being had to the accompanying drawings, which form a part of this specification.

My invention relates to improvements in devices for separating oil and water from steam, and is shown in the accompanying drawings, in which—

Figure 1 is a longitudinal sectional view on line $x$—$x$ of Fig. 2. Fig. 2 is a view partly in elevation and partly in transverse section. Fig. 3 is a horizontal sectional view on line $y$—$y$ of Fig. 1.

In the drawings A is the outer wall of the separator.

B is a deep depression from the top, which forms deflecting surfaces B' and B² on the interior. The inner deflecting surfaces are provided with diagonal corrugations $b, b$.

C is a diaphragm forming a false bottom. This bottom C is concaved and provided with a line of openings $c, c$ running lengthwise. These openings are elongated and adapted to catch and pass the water and oil.

The inner surfaces of the separator are corrugated, the corrugations $a, a$ leading to the line of openings $c, c$.

D is the steam inlet, and D' the steam outlet, the course of the steam being shown by the arrows.

E is the discharge opening for oil and water.

F is a chamber formed between the false bottom and the case.

The operation of my device is as follows: It is inserted in the line of pipe conveying the steam to be dried. The saturated steam entering at D is projected against the surface B' and deflected downward, a portion of the oil and water with which it is saturated being carried by reason of its weight against and collected on the surface. The oil and water collected here are conducted to the sides by the diagonal corrugations $b, b$. The steam is next forced against the false bottom C and caused to sweep along its surface lengthwise of the separator and in a curved line. The centrifugal force causes the oil and water remaining to seek the bottom where it is held by the transverse corrugations $a, a$, and conducted by them to the openings $c, c$. The false bottom thus serves as a skimmer, collecting and passing the oil and water to the chamber F, from which they are drawn off through the outlet E.

The advantage of the false bottom, with the line of perforations, over a single bottom with a single opening, is that it overcomes the liability of the steam sweeping the oil and water past the discharge. The chamber F is also provided in which the oil and water can accumulate without danger of being swept or lifted out of the device.

What I claim is—

A separator having a deflecting steam passage, a false bottom at the turn of the passage, said false bottom provided with elongated cross openings, corrugations on the walls of the passage, leading to the openings, and a water chamber below the false bottom whereby the saturated steam is swept over the false bottom, and the water and oil caught by it, substantially as described.

In testimony whereof I sign this specification in the presence of two witnesses.

EUGENE AUSTIN.

Witnesses:
S. B. WARREN,
C. H. FISK.